(12) United States Patent
Doki-Thonon et al.

(10) Patent No.: US 9,239,077 B2
(45) Date of Patent: Jan. 19, 2016

(54) MECHANICAL BEARING

(71) Applicants: Thomas Doki-Thonon, Valence (FR); Alexandre Aury, Tournon-sur-Rhône (FR); Pascal Deloeil, Helesmes (FR)

(72) Inventors: Thomas Doki-Thonon, Valence (FR); Alexandre Aury, Tournon-sur-Rhône (FR); Pascal Deloeil, Helesmes (FR)

(73) Assignees: AKTIEBOLAGET, Goetborg (SE); SKF AEROSPACE FRANCE S.A.S., Saint-Vallier (FR)

( * ) Notice: Subject to any disclaimer, the term of this patent is extended or adjusted under 35 U.S.C. 154(b) by 0 days.

(21) Appl. No.: 14/541,979

(22) Filed: Nov. 14, 2014

(65) Prior Publication Data

US 2015/0167738 A1 Jun. 18, 2015

(30) Foreign Application Priority Data

Nov. 14, 2013 (FR) ...................................... 13 61143

(51) Int. Cl.
| | |
|---|---|
| *F16C 33/46* | (2006.01) |
| *F16C 19/26* | (2006.01) |
| *F16C 33/51* | (2006.01) |
| *F16C 35/04* | (2006.01) |
| *F16C 33/54* | (2006.01) |

(52) U.S. Cl.
CPC ............... *F16C 33/467* (2013.01); *F16C 19/26* (2013.01); *F16C 33/513* (2013.01); *F16C 35/042* (2013.01); *F16C 33/542* (2013.01); *F16C 2240/46* (2013.01); *F16C 2361/61* (2013.01)

(58) Field of Classification Search
CPC ....... F16C 33/51; F16C 33/513; F16C 33/516

USPC ................... 384/564, 577, 578, 579
See application file for complete search history.

(56) References Cited

U.S. PATENT DOCUMENTS

| 3,649,094 | A | | 3/1972 | Russell | |
|---|---|---|---|---|---|
| 5,810,482 | A | * | 9/1998 | Aleynik | ........................ 384/450 |

FOREIGN PATENT DOCUMENTS

| DE | 1026577 B | * | 3/1958 |
|---|---|---|---|
| DE | 8607236 U1 | | 5/1986 |
| DE | 102011085356 A1 | | 5/2013 |
| DE | 102012202104 A1 | | 8/2013 |
| EP | 1408248 A2 | | 4/2004 |
| EP | 2071204 A2 | | 6/2009 |
| JP | S6469822 A | | 3/1989 |
| JP | 2002339981 A | | 11/2002 |
| JP | 2003013963 A | | 1/2003 |
| JP | 2009228682 A | | 10/2009 |
| JP | 2011075925 A | | 4/2011 |
| JP | 2011241862 A | | 12/2011 |
| JP | 2013036510 A | | 2/2013 |

* cited by examiner

*Primary Examiner* — Phillip A Johnson
(74) *Attorney, Agent, or Firm* — Bryan Peckjian; SKF USA Inc. Patent Dept.

(57) ABSTRACT

A mechanical bearing having an outer ring and an inner ring, centered on a same bearing axis, the outer ring being arranged radially around the inner ring, and a cage, arranged coaxially between the inner ring and the outer ring and housing cylindrical rollers, with this cage being formed by several disjointed tubular portion which, in the assembled state of the bearing, are separated from each other by a non-zero gap. The cage is formed by at least three disjointed tubular portions that do not cooperate mechanically with each other in assembled state of the bearing.

12 Claims, 2 Drawing Sheets

MECHANICAL BEARING

FIELD OF THE INVENTION

The invention relates to a mechanical bearing.

BACKGROUND OF THE INVENTION

In a known manner, a mechanical bearing comprises an outer ring and an inner ring which are centred on the same axis and a cage which is arranged coaxially between the inner ring and the outer ring. This cage is a single-piece tubular part that houses rolling elements, which are maintained in relation to one another in order to prevent them from colliding with each other.

The invention relates more particularly to high-speed mechanical bearings such as the bearings used in the sungear of a planetary gearset. Indeed, at a high rotating speed, the rolling elements housed in the cage undergo a substantial centrifugal force. These centrifugal forces are not equivalent across the entire periphery of the cage and generate high stresses at certain zones of the cage. As such, only certain portions of the cage are particularly solicited by the centrifugal forces. The stresses generated in these portions result however from a global deformation of the cage, which implies poor guiding in rotation of the rolling elements.

In practice, the deformation of the cage linked to the centrifugal forces is limited by using a more resistant material and more substantial sections in the most solicited zones. However, these localised reinforcements increase the mass of the cage and therefore generate more substantial centrifugal forces.

In order to overcome these disadvantages, the cage of certain bearings is replaced by a set of independent inserts which are arranged between each pair of rolling elements of the mechanical bearing. These inserts effectively make it possible to maintain the rolling elements separated and overcome the problem of deformation of the cage due to the centrifugal effects. However, this solution is not suited for high-speed mechanical bearings as the rolling elements are not sufficiently maintained and have, therefore, a random kinematics. More precisely, the rolling elements tend to pivot, at high speed, around an axis of rotation other than their main axis of rotation. This parasite movement of rotation implies a misaligning of the rolling elements which is detrimental to the capacity for guiding in rotation of the mechanical bearing.

Moreover, DE-A-10 2012 202 104 discloses a cage of a mechanical bearing which is carried out in two portioned adapted to be assembled to one another. In this document, the cage is segmented into two portions in order to facilitate the method of manufacture and allow for mass production. Indeed, segmenting the cage into two portions makes it possible to use the injection moulding technique to manufacture the two portions of the cage. As such, in the assembled configuration in the bearing, the two portions of the cage are assembled with each other so well that the forces that are applied on a portion of the cage are transmitted to the other portion and the cage is deformed.

Likewise, JP-A-2013-036510 discloses a cage of a mechanical bearing which is segmented into several portions, which facilitates the manufacture of the cage. The various portions of the cage are placed side by side in an abutting manner in the assembled configuration of the bearing so well that there is a transmission of the forces from one portion to the other and a globalised deformation of the cage.

Finally, JP-A-2009 228 682 discloses a bearing wherein the rolling elements are cylindrical rollers maintained by a cage segmented into two semi-circular portions. The two ends of each segment of the cage are provided with a housing in order to partially receive a roller. In the assembled configuration of the bearing, the two segments of the cage are therefore separated at their ends by two rollers. The rollers inserted between the two segments then transmit the forces from one segment to the other, i.e. the two segments cooperate mechanically with each other. The centrifugal forces that are applied on one segment of the cage are therefore transmitted to the other segment, which results in a globalised deformation of the cage.

It is these disadvantages that the invention intends more particularly to overcome by proposing a mechanical bearing that makes it possible to reduce the deformation of the cage linked to the centrifugal forces at high speed, while still retaining good capacities for guiding in rotation.

SUMMARY OF THE INVENTION

To this effect, the invention relates to a mechanical bearing, comprising an outer ring and an inner ring, centred on the same bearing axis, the outer ring being arranged radially around the inner ring, and a cage, arranged coaxially between the inner ring and the outer ring and housing cylindrical rollers, with this cage being formed by several disjointed tubular portions that, in the assembled state of the bearing, are separated from each other by a non-zero gap. In accordance with the invention, the cage is formed by at least three disjointed tubular portions that do not cooperate mechanically with each other in assembled state of the bearing.

Thanks to the invention, the centrifugal forces that are applied on a portion of the cage are not transmitted to the other portions of the cage because the cage is not a single piece, but formed by several disjointed portions, i.e. independent from one another. In other words, a non-zero gap subsists between each pair of successive portions of cage, i.e. the portions of the cage do not cooperate mechanically with each other. As such, the stresses exerted in a localised manner on the cage do not generate a globalised deformation of the cage.

According to advantageous but not mandatory aspects of the invention, a mechanical bearing can incorporate one or several of the following characteristics, taken in any technically admissible combination:

The cage is formed by four tubular portions.

The four tubular portions of the cage are identical.

In the assembled state of the bearing, the gap that separates the portions of the cage is between 10 and 70% of the space between two adjacent cylindrical rollers.

Each portion of the cage delimits at least one through housing for receiving a cylindrical roller.

Each portion of the cage delimits several housings for receiving rollers.

The housings for receiving rollers of each tubular portion are regularly spaced around the bearing axis.

Each portion of the cage delimits the same number of housings for receiving cylindrical rollers.

Each portion of the cage delimits three housings for receiving rollers.

The housing or housings of each portion of the cage have a rectangular contour, of which the dimensions correspond to those of the cylindrical rollers.

The inner ring comprises a peripheral groove wherein the cylindrical rollers are partially housed.

The cage is guided by the inner ring, i.e. it exerts, during operation, a centring force on the inner ring.

BRIEF DESCRIPTION OF THE DRAWINGS

The invention shall be better understood and other advantages of the latter shall appear more clearly when reading the following description of an embodiment of a mechanical bearing in accordance with its principle, provided solely by way of example and made in reference to the drawings wherein.

DETAILED DESCRIPTION OF THE INVENTION

Figure 1:
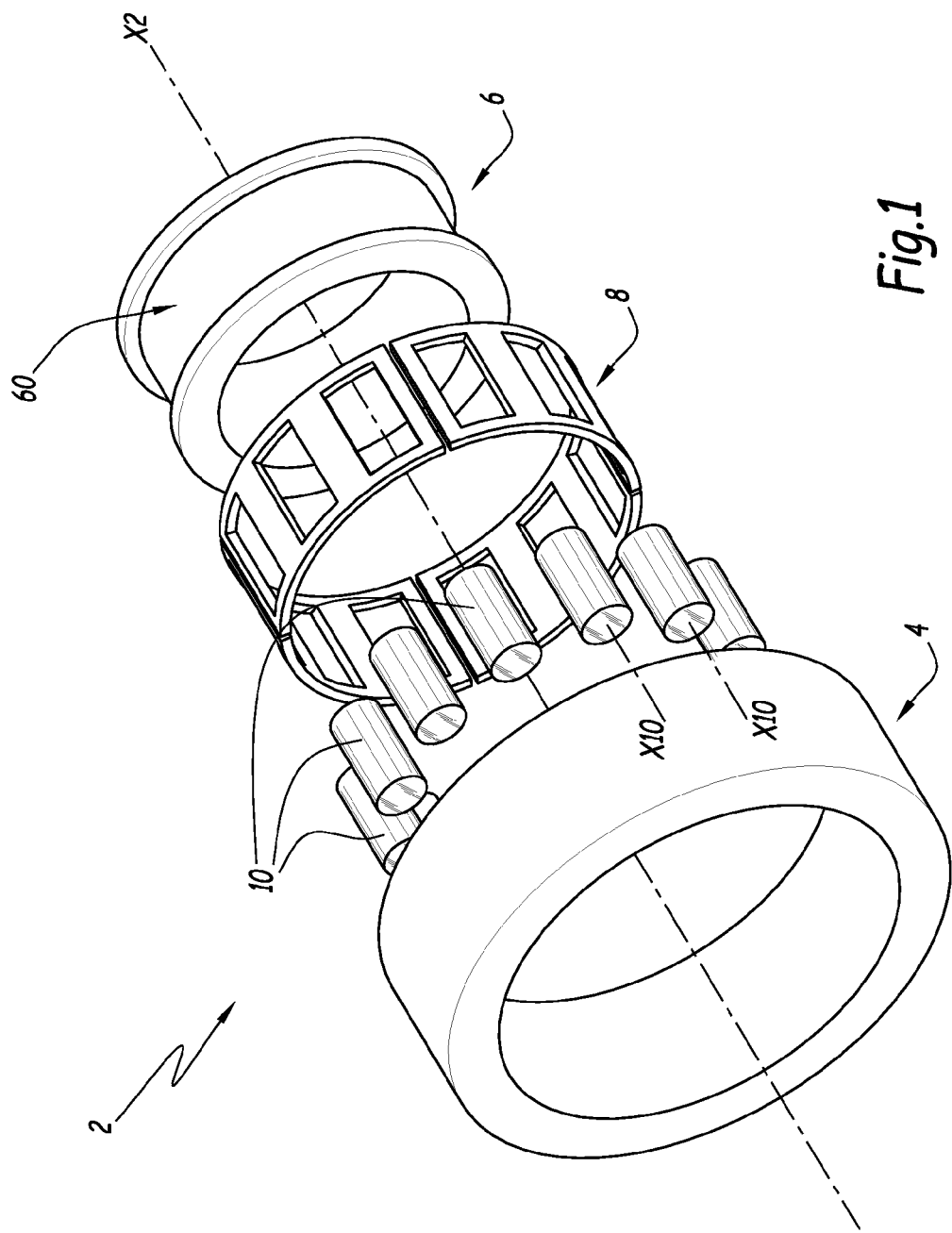
FIG. 1 is a perspective exploded view of a mechanical bearing in accordance with the invention.

FIG. 1 shows a mechanical bearing 2 which is centred on a bearing axis X2. This mechanical bearing 2 comprises an outer ring 4 and an inner ring 6, which are centred on the bearing axis X2. The inner ring 6 is arranged radially inside the outer ring 4. A cage 8 is arranged coaxially between the inner ring 6 and the outer ring 4. This cage 8 is globally tubular and houses rolling elements 10. In the example, the rolling elements 10 are cylindrical rollers that extend parallel to the axis X2 and which are each centred on an axis X10 parallel to the axis X2, with this axis X10 representing the axis of rotation of the roller 10 during operation. The rollers 10 are partially housed in a peripheral groove 60 of the inner ring 6. The rollers 10 are in contact, on the one hand, with the bottom of the peripheral groove 60 of the inner ring 6 and, on the other hand, with the internal radial surface of the outer ring 4.

Figure 2:
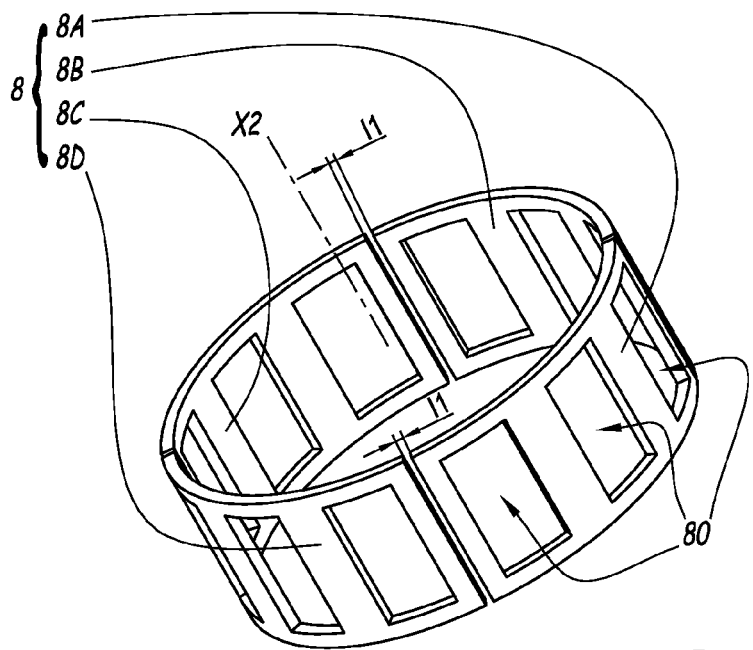
FIG. 2 is a perspective view of a cage belonging to the bearing of FIG. 1.

As can be seen in FIG. 2, the cage 8 is formed of four disjointed tubular portions, respectively referenced as 8A to 8D. In other words, the cage 8 is not a single piece. The portions 8A to 8D of the cage 8 are each centred on the axis X2, i.e. they each extend over an angular sector, centred on the axis X2. In the example considered, the four angular sectors concerned are equal to one another, with an angle at the top equal to about 90°. In the assembled state of the bearing, a non-zero gap I1 subsists between each pair of successive portions of the cage 8, with this gap being between 10% and 70% of the free space between two adjacent rolling elements, in particular of a magnitude of 25%. As such, there is no mechanical cooperation between the portions of the cage. This makes it possible to prevent the various portions of the cage 8 from colliding with each other and the forces applies on a portion are transmitted to the two adjacent portions.

Each portion of the cage 8 comprises through housings 80 each adapted to receive rollers 10. Advantageously, each portion of the cage delimits the same number of housings 80. In the example, this number is equal to three but can, alternatively, be different from three as long as it is not zero. As such, the bearing 2 is provided with twelve rollers 10. Here, the through housings 80 are cut-outs with a rectangular contour which are regularly spaced around the axis X2. In this way, in the assembled state of the bearing 2, the rolling elements, or rollers 10, are regularly distributed around the axis X2 and performance of guiding in rotation of the bearing 2 are not altered. In practice, the dimensions of the contour of the housings 80 correspond to the dimensions of the cylindrical rollers 10. More precisely, the greatest dimensions of the contour of the housings 80 correspond to the length of the rollers 10 while the other dimension of the contour corresponds to the diameter of the roller 10.

As such, each portion of the cage 8 controls the kinematics of the rollers 10 that are housed in this portion. In other terms, the only degree of freedom authorised by each portion of the cage 8 for the rollers 10 that it houses is a movement of rotation around their axis of rotation X10. Maintaining the rollers 10 aligned, i.e. centred on their axes of rotation X10, makes it possible to obtain a bearing 2 that has good capacities for guiding in rotation.

Figure 3:
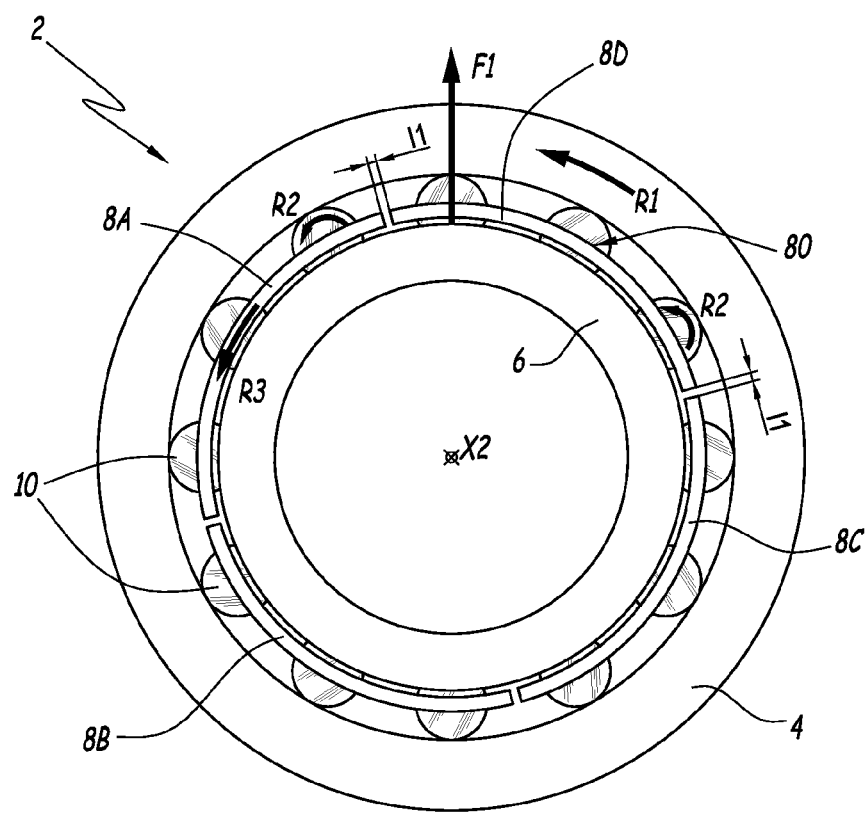
FIG. 3 is a side view of the bearing of FIG. 1 in an assembled configuration.

In practice, the mechanical bearing 2 is positioned in an assembly in such a way that the outer ring 4 is driven in rotation about the axis X2. As such, as can be seen in FIG. 3, the outer ring 4 pivots about the axis X2 with a movement of rotation R1. This movement of rotation R1 generates a rotation R2 on rollers 10 that rotate about their axis X10. The contact between the rollers 10 and the inner ring 6 is of the slip-free bearing type. However, in conditions of lubricated operation, the kinematics between the rollers 10 and the inner ring 6 cause rolling and sliding. The rollers 10 thus roll around the inner ring 6 in the groove 60 and drive the cage 8 according to a movement of rotation R3 about the axis X2.

As such, in operation, the rollers 10 and the cage 8 are subjected to a centrifugal force F1 which is a force radial to the axis X2 directed outwards. This centrifugal force generates stresses on each portion 8A, 8B, 8C, 8D of the cage 8. However, certain portions of the cage 8 are more solicited, i.e. are more sensitive to the centrifugal forces, than others. As such, the stresses generated in one of the portions of the cage 8 do not imply any deformations on other portions of the cage 8 as the portions 8A to 8D are disjointed, i.e. independent.

Consequently, in opposition with a single-piece cage of prior art where the stresses applied to a location of the cage affect the general shape of the cage, a localised deformation on the cage 8 according to the invention does not imply any globalised deformation of the cage 8.

For example, considering that the portion 8D of the cage 8 is the most solicited portion by the centrifugal forces, these forces are not transmitted to the portions 8A, 8B and 8C as the latter are disjointed. Inversely, the forces linked for example to gravity are applied to the portions 8A, 8B and 8C are not transmitted to the portion 8D of the cage 8. This makes it possible to prevent overstressing on the portion 8D of the cage 8. In addition, the cage 8 retains a generally tubular shape centred on the bearing axis X2.

During operation, the cage 8 exerts a force on the inner ring 6. It is said that the cage 8 is guided by the inner ring and that this force is a centring force. Alternatively, the cage 8 can be guided by the outer ring 4.

Here, as the cage 8 retains a generally tubular geometry centred on the axis X2, the centring force on the cage is reduced. In practice, this centring force is all the more so lower than the cage 8 is segmented into a substantial number of portions. However, a cage segmented into an excessive number of portions would no longer provide for the maintaining of the rolling elements centred on their axis of rotation X10.

Segmenting the cage 8 into four portions makes it globally possible to reduce the centring force fourfold since the mass of the cage 8 exerting a pressure on the inner ring 6 is four times less for the cage 8 according to the invention than for a single-piece cage of prior art. This makes it possible in particular to prevent ruptures due to S-shaped items or due to an excessive ovalisation of the cage 8 which are observed during the use of a single-piece cage in high-speed bearings and the degradations of the ring 6 and of the cage 8 are reduced during the operation of the bearing.

Finally, the rolling elements 10 housed in the portions of the cage that are the least solicited by the centrifugal forces retain their alignment, which makes it that the bearing 2 has good capacities for guiding in rotation at high speed.

In an alternative not shown, the rolling elements 10 are not cylindrical rollers but for example balls.

In an alternative not shown, the cage 8 is formed by a number of portions different from 4. For example, it is possible to segment the cage 8 into two or three. In practice, the cage 8 is never segmented according to a number that exceeds half of the rolling elements.

In an alternative not shown, it is the inner ring 6 which is driven in rotation about the bearing axis X2.

The technical characteristics of the embodiments and alternatives considered hereinabove can be combined together in order to give new embodiments of the invention.

The invention claimed is:

1. A mechanical bearing comprising:
    an outer ring and an inner ring, centred on a bearing axis, the outer ring being arranged radially around the inner ring; and
    a cage, arranged coaxially between the inner ring and the outer ring and housing cylindrical rollers, the cage being formed by several disjointed tubular portions which, in the assembled state of the bearing, are separated from each other by a non-zero gap,
    wherein the cage is formed by at least three disjointed tubular portions, that do not cooperate mechanically with each other in assembled state of the bearing.

2. The bearing according to claim 1, wherein the cage is formed by four tubular portions.

3. The bearing according to claim 2, wherein the four tubular portions of the cage are identical.

4. The bearing according to claim 1, wherein in the assembled state of the bearing, the gap that separates the portions of the cage is between 10 and 70% of the space between two adjacent cylindrical rollers.

5. The bearing according to claim 1, wherein each portion of the cage delimits at least one through housing for receiving a cylindrical roller.

6. The bearing according to claim 5, wherein each portion of the cage delimits several through housings for receiving rollers.

7. The bearing according to claim 6, wherein the through housings for receiving rollers of each tubular portion are regularly spaced about the bearing axis.

8. The bearing according to claim 5, wherein each portion of the cage delimits the same number of through housings for receiving rollers.

9. The bearing according to claim 8, wherein each portion of the cage delimits three through housings for receiving rollers.

10. The bearing according to claim 5, wherein the at least one through housing of each portion of the cage present a rectangular contour, of which the dimensions correspond to those of cylindrical rollers.

11. The bearing according to claim 1, wherein the inner ring includes a peripheral groove wherein the cylindrical rollers are partially housed.

12. The bearing according to claim 1, wherein the cage is guided by the inner ring and exerts, during operation, a centring force on the inner ring.

* * * * *